United States Patent
Byun

(10) Patent No.: US 11,178,059 B2
(45) Date of Patent: Nov. 16, 2021

(54) APPARATUS AND METHOD OF MANAGING CONTENT NAME IN INFORMATION-CENTRIC NETWORKING

(71) Applicant: ELECTRONICS AND TELECOMMUNICATIONS RESEARCH INSTITUTE, Daejeon (KR)

(72) Inventor: Sung Hyuk Byun, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 125 days.

(21) Appl. No.: 16/666,916

(22) Filed: Oct. 29, 2019

(65) Prior Publication Data
US 2020/0136981 A1    Apr. 30, 2020

(30) Foreign Application Priority Data

Oct. 30, 2018  (KR) .................. 10-2018-0131011
Oct. 25, 2019  (KR) .................. 10-2019-0134045

(51) Int. Cl.
 *H04L 12/851*  (2013.01)
 *H04L 12/841*  (2013.01)
 *H04L 12/745*  (2013.01)
 *H04L 12/859*  (2013.01)

(52) U.S. Cl.
CPC ........ *H04L 47/2441* (2013.01); *H04L 45/748* (2013.01); *H04L 47/2475* (2013.01); *H04L 47/2483* (2013.01); *H04L 47/283* (2013.01)

(58) Field of Classification Search
None
See application file for complete search history.

(56) References Cited

U.S. PATENT DOCUMENTS

| 9,577,924 | B2 | 2/2017 | Ko et al. | |
|---|---|---|---|---|
| 10,158,973 | B1 * | 12/2018 | Surcouf | H04W 4/024 |
| 2015/0222479 | A1 | 8/2015 | Kim et al. | |
| 2015/0350078 | A1 | 12/2015 | Azgin et al. | |
| 2016/0212066 | A1 * | 7/2016 | Ravindran | H04L 47/80 |
| 2018/0077052 | A1 | 3/2018 | Moiseenko et al. | |
| 2018/0242218 | A1 * | 8/2018 | Muscariello | H04W 80/00 |
| 2019/0158370 | A1 * | 5/2019 | You | H04L 41/0853 |
| 2019/0199633 | A1 * | 6/2019 | Azgin | H04L 67/327 |

FOREIGN PATENT DOCUMENTS

| KR | 10-2016-0002154 A | 1/2016 |
|---|---|---|
| KR | 10-2016-0002155 A | 1/2016 |

* cited by examiner

*Primary Examiner* — Christine T Duong
(74) *Attorney, Agent, or Firm* — LRK Patent Law Firm

(57) ABSTRACT

The present invention relates to a method and a device for fast forwarding a flow traffic in an information-centric networking (ICN). According to the present invention, a flow switching method for a network node of an information-centric networking (ICN) includes: identifying a data name contained in a received interest packet and identifying a flow name from the data name, thereby determining whether a flow entry corresponding to the identified flow name is present within a flow table (FT); identifying forwarding information base (FIB) entry information matched to the flow name from the corresponding flow entry and identifying an FIB entry corresponding to the FIB entry information; and transmitting the interest packet on the basis of interface information included in the identified FIB entry.

20 Claims, 7 Drawing Sheets

| 401 | 402 | 403 |
|---|---|---|
| Flow name | Time Information | Flow-Matched FIB entry information |

FIG.6

FIB entry example for prefix /youtube.com/bts

| Name prefix (/youtube.com/bts) | Forwarding Strategy (Best Route) | Nexthop list (2,5) |
|---|---|---|
| 601 | 602 | 603 |

APPARATUS AND METHOD OF MANAGING CONTENT NAME IN INFORMATION-CENTRIC NETWORKING

CROSS REFERENCE TO RELATED APPLICATION S

The present application claims priority to Korean Patent Applications Nos. 10-2018-0131011, filed Oct. 30, 2018, and 10-2019-0134045, filed Oct. 25, 2019, the entire contents of which are incorporated herein for all purposes by this reference.

BACKGROUND OF THE INVENTION

1. Field of the Invention

The present invention relates to data processing in an information-centric networking (ICN). More particularly, the present invention relates to a method and a device for fast forwarding flow traffic in an information-centric networking (ICN).

2. Description of Related Art

The proliferation of the Internet and electronic commerce continues to accelerate evolutionary change in the network industry. Today, from online movie viewing to daily news delivery, consumer sales, and instant messaging, a significant number of information exchanges are carried out online. Regarding this, the current Internet mainly operates on location-based addressing schemes. The two most common protocols, the Internet protocol (IP) and the Ethernet protocol, are based on location-based addresses. That is, the consumer of the content can only receive the content by explicitly requesting the content from an address (for example, an IP address or an Ethernet media access control (MAC) address) that is closely associated with the physical object or location. Thus, this limited location-based addressing scheme is becoming increasingly inadequate to meet the changing demands for information-centric networks.

Recently, information-centric networking (ICN) architecture has been proposed in the industry. The ICN is a new networking technology to replace the conventional networking method using IP. That is, unlike the IP networking method of requesting and forwarding information on the basis of the location address of the information when exchanging information, information is requested and is subjected to forwarding on the basis of the name of the information (or "name-based" information).

In the data processing operation of the general ICN in the related art, first, a data requester transmits an "interest packet" that contains a data name in a data packet header to the ICN network. Any ICN node receiving the interest packet within the ICN network forwards the received interest packet on the basis of the data name. Afterward, when arriving at a particular ICN node that caches or owns the data, the node responds by putting information in a "data packet". Herein, the information is transmitted to the data requester by reversely tracing the path through which the interest packet is transmitted.

Herein, the conventional ICN node includes the pending interest table (PIT) storing information on the unanswered interest, the content storage (CS) caching the data packet that passes through the node, and the forwarding information base (FIB) forwarding the interest packet on the basis of the data name.

In this regard, the data name used in ICN has a hierarchical structure composed of multiple name components. Therefore, for FIB forwarding, the ICN node needs to perform FIB search using the longest prefix match (LPM) method, in which the longest entry among the FIB entries that match data names is found on the basis of a name prefix. Particularly, in the conventional NDN/CCN method, the data name has no limit on the number and the length of name components, and thus many table lookups are required to search the FIB using the longest prefix match (LPM) method for each interest packet, which is major constraint in improvement in forwarding performance.

In the meantime, it is known that video traffic accounts for 70% or more of the Internet traffic. Including a video, the data on the Internet to be exchanged in ICN has a lot of flow traffic that is very likely to be composed of one or more packets. Therefore, processing delay of flow traffic causes degradation of overall ICN forwarding performance.

The foregoing is intended merely to aid in the understanding of the background of the present invention, and is not intended to mean that the present invention falls within the purview of the related art that is already known to those skilled in the art.

SUMMARY OF THE INVENTION

The present invention is intended to propose a method and a device for fast forwarding for an ICN node in information-centric networking.

Also, the present invention is intended to propose a method and a device for fast forwarding flow data, which are compatible with the conventional information-centric networking.

Also, the present invention is intended to propose an information-centric networking including a network node that supports fast flow forwarding in which the content divided into segments is processed quickly and efficiently.

It is to be understood that technical problems to be solved by the present invention are not limited to the aforementioned technical problems and other technical problems which are not mentioned will be apparent from the following description to a person with an ordinary skill in the art to which the present invention pertains.

According to the present invention, there is provided a flow switching method in a network node of an information-centric networking, the method including: identifying a data name contained in a received interest packet and identifying a flow name from the data name, thereby determining whether a flow entry corresponding to the identified flow name is present within a flow table (FT); identifying forwarding information base (FIB) entry information matched to the flow name from the corresponding flow entry and identifying an FIB entry corresponding to the FIB entry information; and transmitting the interest packet on the basis of interface information included in the identified FIB entry.

Also, in the flow switching method in the network node of the information-centric networking according to the present invention, the flow entry of the flow table (FT) may include the flow name, time information, and a flow-matched FIB entry identifier.

Also, the flow switching method in the network node of the information-centric networking according to the present invention may further include constructing a new flow entry that includes the flow name, the time information, and the flow-matched FIB entry identifier when the flow entry corresponding to the flow name is not present in the flow table (FT).

Also, in the flow switching method in the network node of the information-centric networking according to the present invention, a result of an FIB entry lookup for the first segment interest packet may be stored in the flow entry of the flow table (FT), and when an interest packet requesting another segment belonging to a corresponding flow is received, forwarding may be performed with one FIB lookup on the basis of flow-matched FIB entry information stored in the flow table (FT).

Also, in the flow switching method in the network node of the information-centric networking according to the present invention, at the transmitting of the interest packet on the basis of the interface information included in the identified FIB entry, a longest prefix match (LPM) lookup for finding the FIB entry may not be performed.

Also, in the flow switching method in the network node of the information-centric networking according to the present invention, from the received data name, a name component constituting a common name may be set as the flow name and the remaining component may be distinguished by a segment number such that the flow name is identified.

Also, in the flow switching method in the network node of the information-centric networking according to the present invention, the time information refers to a time remaining until the flow entry is deleted, and is reset to, when an interest packet requesting another segment belonging to the flow name is received within the time, an initial value assigned to the flow name.

Also, in the flow switching method in the network node of the information-centric networking according to the present invention, the time information refers to an arrival time of the interest packet that most recently matched to the flow entry, and when an interest packet requesting another segment belonging to the flow name is received within a preset time, the time information is updated with the arrival time of a corresponding interest.

Also, in the flow switching method in the network node of the information-centric networking according to the present invention, the method further comprising: checking validity of the flow entry. The checking of the validity of the flow entry includes: identifying whether a prefix of the FIB entry and the flow name match, wherein when the prefix of the FIB entry and the flow name match, it is determined that the FIB entry information is valid, and interest forwarding is performed using forwarding information that includes a nexthop list and a forwarding strategy within the FIB entry; and when the prefix of the FIB entry and the flow name do not match, it is determined that the FIB information is changed, a corresponding interest is marked as a new flow interest, an FIB is subjected to a longest prefix match (LPM) lookup to find a new matched FIB entry, and forwarding is performed on the basis of corresponding information; and the corresponding interest is recognized as the new flow interest, and the flow entry in the flow table is updated with new FIB entry information.

According to the present invention, there is provided a network node of an information-centric networking (ICN), wherein the network node supports fast flow switching, the network node including: a flow table containing a flow entry; a segment identification unit identifying a data name contained in a received interest packet and identifying a flow name from the data name; and a flow management unit configured to, determine whether the flow entry corresponding to the identified flow name is present within the flow table, identify FIB entry information matched to the flow name from the corresponding flow entry, identify an FIB entry corresponding to the FIB entry information, and transmit the interest packet on the basis of interface information included in the identified FIB entry.

Also, in the network node, which supports fast flow switching, of the information-centric networking (ICN) according to the present invention, the flow entry of the flow table may include the flow name, time information, and a flow-matched FIB entry identifier.

Also, in the network node, which supports fast flow switching, of the information-centric networking (ICN) according to the present invention, the flow management unit may set, in the flow table, a new flow entry including the flow name, the time information, and the flow-matched FIB entry identifier when the flow entry corresponding to the flow name is not present in the flow table.

Also, in the network node, which supports fast flow switching, of the information-centric networking (ICN) according to the present invention, the flow management unit may be configured to store a result of an FIB lookup for the first segment interest packet in the flow entry of the flow table (FT), and perform forwarding with one FIB lookup on the basis of flow-matched FIB entry information stored in the flow table (FT) when an interest packet requesting another segment belonging to a corresponding flow is received.

Also, in the network node, which supports fast flow switching, of the information-centric networking (ICN) according to the present invention, the flow management unit may not perform a longest prefix match (LPM) lookup for finding the FIB entry, at the transmitting of the interest packet on the basis of the interface information included in the identified FIB entry.

Also, in the network node, which supports fast flow switching, of the information-centric networking (ICN) according to the present invention, the segment identification unit may be configured to set, from the received data name, a name component constituting a common name as the flow name and distinguish the remaining component by a segment number such that the flow name is identified.

Also, in the network node, which supports fast flow switching, of the information-centric networking (ICN) according to the present invention, the time information refers to a time remaining until the flow entry is deleted, and is reset to, when an interest packet requesting another segment belonging to the flow name is received within the time, an initial value assigned to the flow name.

Also, in the network node, which supports fast flow switching, of the information-centric networking (ICN) according to the present invention, the time information refers to an arrival time of the interest packet that most recently matched to the flow entry, and when an interest packet requesting another segment belonging to the flow name is received within a preset time, the time information is updated with the arrival time of a corresponding interest.

Also, in the network node, which supports fast flow switching, of the information-centric networking (ICN) according to the present invention, the flow management unit checks validity of the flow entry. The checking of the validity of the flow entry by the flow management unit includes: identifying whether a prefix of the FIB entry and the flow name match, wherein when the prefix of the FIB entry and the flow name match, it is determined that the FIB entry information is valid, and interest forwarding is performed using forwarding information that includes a nexthop list and a forwarding strategy within the FIB entry; and when the prefix of the FIB entry and the flow name do not match, it is determined that the FIB information is changed, a corresponding interest is marked as a new flow interest, an FIB is subjected to a longest prefix match (LPM) lookup to find a new matched FIB entry, and forwarding is performed on the basis of corresponding information; and the corresponding interest is recognized as the new flow interest, and the flow entry in the flow table is updated with new FIB entry information.

Also, according to the present invention, there is provided an information-centric networking (ICN) supporting fast flow switching, the ICN network including: a client node generating and transmitting an interest packet to receive information or content; a data providing node providing the information or the content in response to the interest packet; and a router node receiving the interest packet from the client node and transmitting the interest packet to the data providing node, wherein the router node is configured to, identify a data name contained in the received interest packet, identify a flow name from the data name, thereby determining whether a flow entry corresponding to the identified flow name is present in a flow table (FT), identify forwarding information base (FIB) entry information matched to the flow name from the corresponding flow entry, and identify an FIB entry corresponding to the FIB entry information, and transmit the interest packet on the basis of interface information included in the identified FIB entry.

According to the present invention, a method and a device capable of quickly and efficiently processing the flow traffic divided into segments can be provided.

According to the present invention, a method and a device capable of being compatible with the existing name-based network method and of quickly and efficiently processing the flow traffic can be provided.

Effects that may be obtained from the present invention will not be limited to only the above described effects. In addition, other effects which are not described herein will become apparent to those skilled in the art from the following description.

BRIEF DESCRIPTION OF THE DRAWINGS

The above and other objects, features and other advantages of the present invention will be more clearly understood from the following detailed description when taken in conjunction with the accompanying drawings, in which:

FIG. 6 is a diagram illustrating an example of an FIB entry configuration in information-centric networking applied to the present invention;

DETAILED DESCRIPTION OF THE INVENTION

Figure 1:
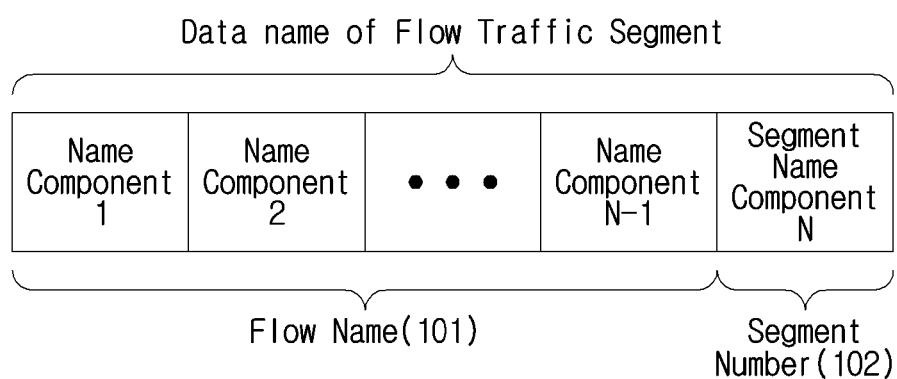
FIG. 1 is a diagram illustrating an example of a hierarchical name structure of a segment in a network having a hierarchical name structure applied to the present invention.

Hereinbelow, exemplary embodiments of the present invention will be described in detail with reference to the accompanying drawings such that the present invention can be easily embodied by those skilled in the art to which this present invention belongs. However, the present invention may be embodied in various different forms and should not be limited to the embodiments set forth herein.

In describing the embodiments of the present invention, if it is decided that the detailed description of known function or configuration related to the invention make the subject matter of the invention unclear, the detailed description is omitted. Also, parts that are not related to the description of the present invention are omitted from the drawings, and like reference numerals designate like parts.

In the present invention, when a constituent element is "coupled to", "combined with", or "connected to" another constituent element, it can be directly coupled to the other constituent element or intervening constituent elements may be present therebetween. Also, when a component "comprises" or "includes" a constituent element, unless there is another opposite description thereto, the component does not exclude other constituent elements but may further include the constituent elements.

In the present invention, constituent elements that are distinguished from each other to clearly describe each feature do not necessarily denote that the constituent elements are separated. That is, a plurality of constituent elements may be integrated into one hardware or software unit, or one constituent element may be distributed into a plurality of hardware or software units. Accordingly, even if not mentioned, the integrated or distributed embodiments are included in the scope of the present invention.

In the present invention, constituent elements described in various embodiments do not denote essential constituent elements, and some of the constituent elements may be optional. Accordingly, an embodiment that includes a subset of constituent elements described in another embodiment is included in the scope of the present invention. Also, an embodiment that includes the constituent elements which are described in the various embodiments and additional other constituent elements is also included in the scope of the present invention.

Also, regarding information-centric networking (ICN) referred to in the present invention, named data networking (NDN) providing name-based networking or content-centric networking (CCN) is known as the representative technology. Therefore, in the present invention, an ICN node based on the NDN/CCN structure will be described as an example. That is, it is obvious that the ICN node described in the present invention may be a network node applied to the NDN or CCN. However, the ICN node or network node in the present invention is not necessarily limited and applied to the NDN or CCN. That is, a fast flow forwarding processing method by the ICN node including the technical idea of the present invention may be applied to any further name-based networking method.

Hereinafter, embodiments of the present invention will be described with reference to the accompanying drawings.

FIG. 1 is a diagram illustrating an example of a hierarchical name structure of a segment in a network having a hierarchical name structure applied to the present invention.

In general, the ICN is used to request and receive data using the name of the information itself that an application transmits and receives, as the data name of the network layer. That is, when the information that the application transmits and receives is a large file or a flow traffic that is continuous such as a sensor stream, it is impossible to exchange the information using a single data packet. Therefore, the information is divided into segments in appropriate size and is transmitted and received in segments. In the name-based network using a hierarchical name structure, such as NDN/CCN, a data segment is generally distinguished by a segment number followed by a common data name. For example, assuming that in the NDN/CCN, YouTube video "/youtube.com/bts/seoul-concert" represented in the URI format is divided into 1000 segments, the video is divided into 1000 segments for exchange, which are called/youtube.com/bts/seoul-concert/1, /youtube.com/bts/seoul-concert/2, . . . , /youtube.com/bts/seoul-concert/10000. In the URI format representation of the hierarchical name of the NDN/CCN, the name component may be distinguished by a particular symbol (for example, "/"). For example, it is found that the segment name is composed of four name components.

In this regard, "/youtube.com/bts/seoul-concert" of the four name components are three name components that constitute the common name. This is called "flow name" in the present invention. For example, as shown in FIG. 1, the segment name of the flow traffic in the name-based network includes a flow name 101 at the beginning composed of multiple common name components, and a segment name component 102 containing the segment number. Accordingly, when considering the hierarchical name structure of the NDN/CCN, the "flow name 101" may be defined or set as the name components (for example, name component 1, name component 2, . . . , name component N−1) that are present in front of the segment name component 102. However, according to the naming method of the application, the segment name component may be followed by an additional name component. However, considering the general hierarchical name structure of the NDN/CCN, it is allowed that the additional name component is not included in the flow name, and thus also in this case, only the portion ahead of the segment name component may be defined as the flow name. However, this is only one embodiment of the present invention, and it is obvious that various methods can be applied as a method of recognizing the "flow name".

Figure 2:
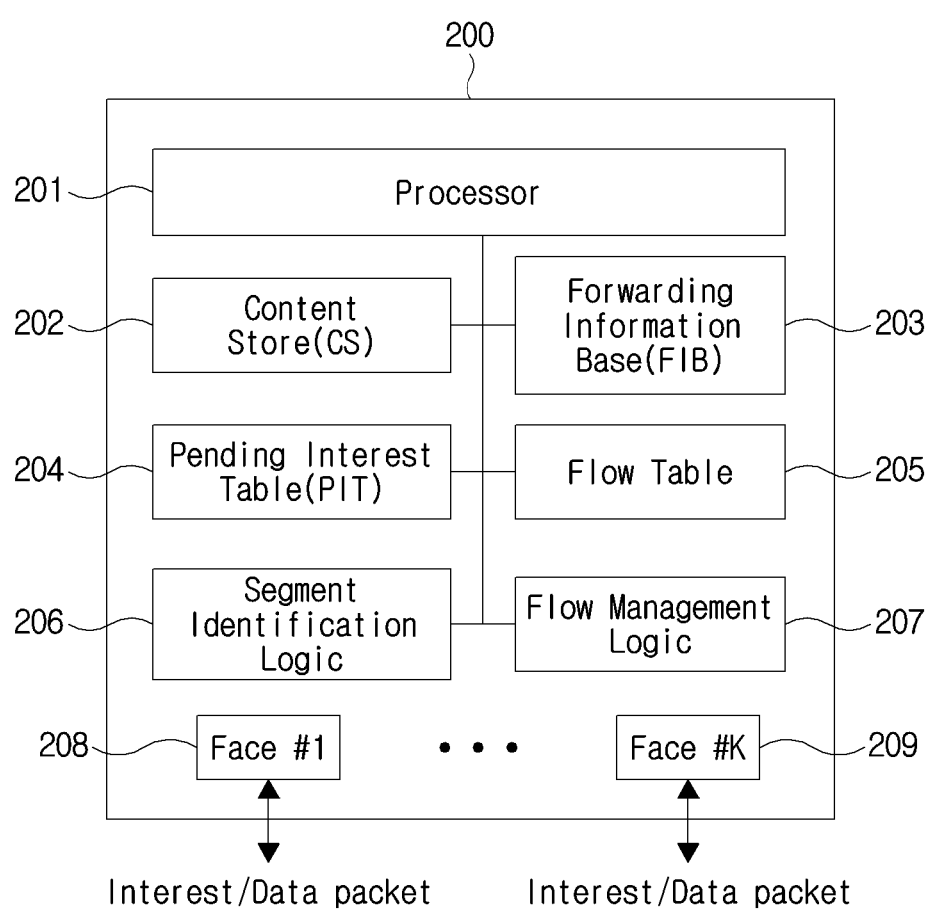
FIG. 2 is a diagram illustrating an example of a configuration that supports flow switching of an ICN node in information-centric networking according to an embodiment of the present invention.

FIG. 2 is a diagram illustrating an example of a detailed configuration of an ICN node according to an embodiment of the present invention. Particularly, FIG. 2 is given to describe a flow switching device of an ICN node that supports flow switching proposed by the present invention.

An ICN node 200 according to an embodiment of the present invention includes a caching unit 202 (hereinafter, referred to as a "content storage (CS)") caching a data packet, a forwarding unit 203 (hereinafter, referred to as a "forwarding information base (FIB)") forwarding an interest packet on the basis of a data name, and an interest table 204 (hereinafter, referred to as a "pending interest table (PIT)") storing information on the unanswered interest. Also, the ICN node 200 according to an embodiment of the present invention further includes interface means 208 and 209 (hereinafter, referred to as "faces") communicating with the external ICN node, and a processor 201 controlling and executing the overall operation of the functional blocks 202 to 209 within the ICN node 200.

Also, the ICN node 200 according to an embodiment of the present invention further includes, in addition to the above configuration, in order to perform fast flow switching, a flow table 205, a segment identification unit 206 (segment identification logic), and a flow management unit 207 (flow management logic).

In this regard, in the ICN node 200 of the present invention in FIG. 2, the functional blocks 201 to 209 are shown as multiple independent blocks for convenience of description, but in the actual implementation, it is obvious that all or a part of the multiple blocks are integrated into a single chip or device.

Further, the CS 202, the PIT 203, the FIB 204, the control processor 201, the multiple faces 208 and 209 that are I/O interfaces, which constitute the ICN node 200 of the present invention are the same or similar to the configuration of the network node based on the general NDN/CCN in the related art. That is, the ICN node 200 of the present invention may operate as the conventional NDN/CCN-based network node, which means that the ICN node 200 of the present invention may be compatibly applied without changing the existing system. Further, such a compatible ICN node 200 may increase probability of use in application to the actual product because the existing NDN/CCN-based network standard does not need to be changed.

In the meantime, in addition to the basic configuration, the ICN node 200 of the present invention further includes the flow table 205 storing an time information and a matched FIB entry address for each flow name, the segment identification unit 206 determining whether the segment name component is present in the data name of the interest packet to identify the portion ahead of the segment name component as the flow name, and the flow management unit 207 managing the flow table and the flow entry within the flow table.

Hereinafter, a fast flow forwarding method of the ICN node 200 will be described in detail.

Figure 3:
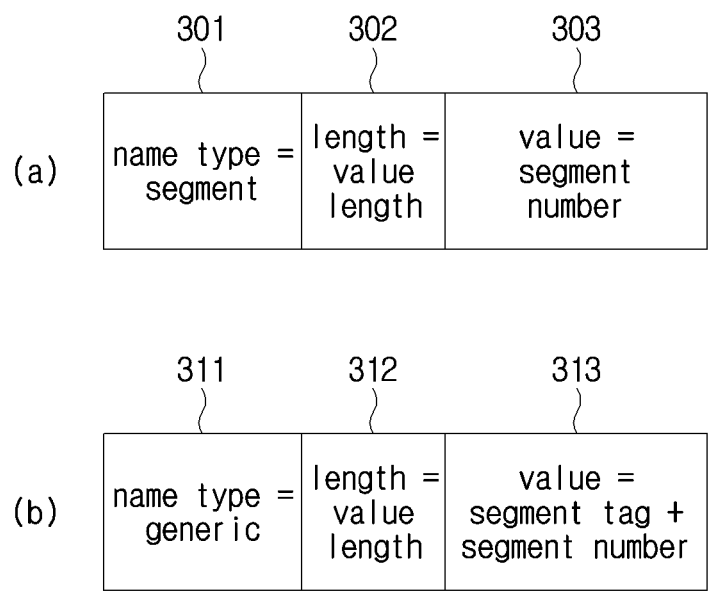
FIG. 3 shows diagrams illustrating examples of representing a segment name component in information-centric networking applied to the present invention.

First, the segment identification unit 206 determines whether the segment name component is present in the data name of the received interest packet. Herein, FIG. 3 shows diagrams illustrating two methods, as examples, of representing the segment name component in the NDN/CCN to describe the operation of the segment identification unit 206. First, (a) in FIG. 3 shows a method in which a particular segment type is defined in a type (name type) field 301 of the name component, the length value is defined in a length field 302, and a segment number is encoded in another field (for example, a value field 303). Herein, each name component has a type length value (TLV) structure. Second, (b) of FIG. 3 shows a method in which a type is defined to a generic type the same as that of another name component in a type field 311 of the name component, the length value is defined in a length field 312, and a particular segment tag is added in addition to a segment number and the result are encoded in another field (for example, a value field 313). Herein, the method shown in (a) of FIG. 3 is a method applicable to both the CCN and the NDN, and the method shown in (b) of FIG. 3 is a method particularly recommended in the NDN. In this regard, in the NDN, "0x00" is used as the segment tag.

The segment identification unit 206 determines whether the segment name component is present in the data name of the interest packet by using the segment name component encoding method (for example, either the method shown in (a) of FIG. 3 or the method shown in (b) of FIG. 3) that the application uses. When it is determined that the segment name component is present in the data name of the interest packet, the data name immediately before the segment name component is extracted and is set as the flow name of the interest for management.

The flow management unit 207 determines whether the flow entry having the flow name is present in the flow table 205 when the segment identification unit 206 identifies the flow name in the received interest packet. When the same flow name is not present in the flow table 205, the interest is set (marked) as a new flow interest. First, the FIB is subjected to the longest prefix match (LPM) lookup to forward the flow to the destination specified by the FIB entry, and then the FIB entry is referenced to generate a new flow entry in the flow table. As another example, when set (marked) as a new flow interest, first, a new flow entry is generated in the flow table, and the FIB is subjected to longest prefix match (LPM) lookup to forward the flow to the destination specified by the FIB entry. Then, the new flow entry is updated with reference to the FIB entry information.

Figure 4:
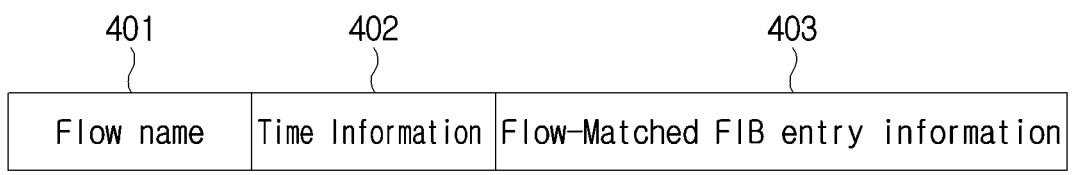
FIG. 4 is a diagram illustrating a flow table entry structure according to an embodiment of the present invention.

In this regard, FIG. 4 is a diagram illustrating an example of a flow entry 400 that is generated in the flow table according to an embodiment of the present invention. Referring to FIG. 4, the flow entry 400 includes a flow name field 401, a time information field 402, and a flow-matched FIB entry information field 403.

As another example, depending on a flow table implementation method, for example, when implemented as a hash table, the flow entry 400 may further include a flow-ID field in which the flow name is subjected to hashing.

Further, the time information field 402 may store various types of time information. For example, the time information may refer to the time remaining until the flow entry 400 is deleted. As another example, the time information may refer to the arrival time of the interest packet that most recently matched to the flow entry. As still another example, the time information may refer to, when the corresponding flow segment request interest arrives, the arrival time of the interest.

In this regard, the time information field may be set to be reset to an initial value assigned to the flow when the corresponding flow segment request interest arrives. Also, the time information field may be updated, when the corresponding flow segment request interest arrives, with the arrival time of the interest.

Further, regarding the flow-matched FIB entry information field 403, the matched FIB entry information in the FIB LPM lookup of the new flow interest is recorded. Specifically, for example, the flow-matched FIB entry information 403 may be an address of the FIB entry.

The flow management unit 207 monitors the time information 402 of the flow table 205 to manage the flow table and the flow entry. For example, the flow management unit 207 deletes the flow entry when the segment request interest within the flow does not arrive for a predetermined time or more. Herein, in order to determine whether the segment request interest arrives within a predetermined time, the time information 402 is used. For example, when the time information refers to the time remaining until the flow entry 400 is deleted, it is determined whether the segment request interest arrives within the time. On the other hand, when the time information refers to the arrival time of the interest packet that most recently matched to the flow entry, it is determined whether the segment request interest arrives within a preset time after the arrival time. The preset time is already set by the flow management unit 207, and may be adjusted as necessary.

Also, the flow management unit 207 may limit the number of flow entries set for each of the faces 208 and 209 to a predetermined number or less in order to prevent the flow table 205 from generating excessive flow entries by a particular user. This is useful in a situation where a limited number of flow entries needs to be maintained.

As another example, if the flow table 205 is full when a new flow interest arrives, the flow management unit 207 deletes, from the flow entries, an idle flow entry in which a segment request interest has not arrived for the longest time through the time information 402, and sets a new flow entry.

As still another example, if the flow table 205 is full when a new flow interest arrives, the flow management unit 207 does not generate a new flow entry anymore. However, even though the flow entry is not generated, the interest may be subjected to forwarding normally by performing the LPM lookup on the FIB. That is, the flow switching function in the ICN proposed by the present invention is intended to improve the interest packet processing procedure of the general NDN/CCN node in the related art, it is not required to change the structure of the interest packet and the data packet in the NDN/CCN, and the data packet processing procedure keeps compatibility the NDN/CCN.

Figure 5:
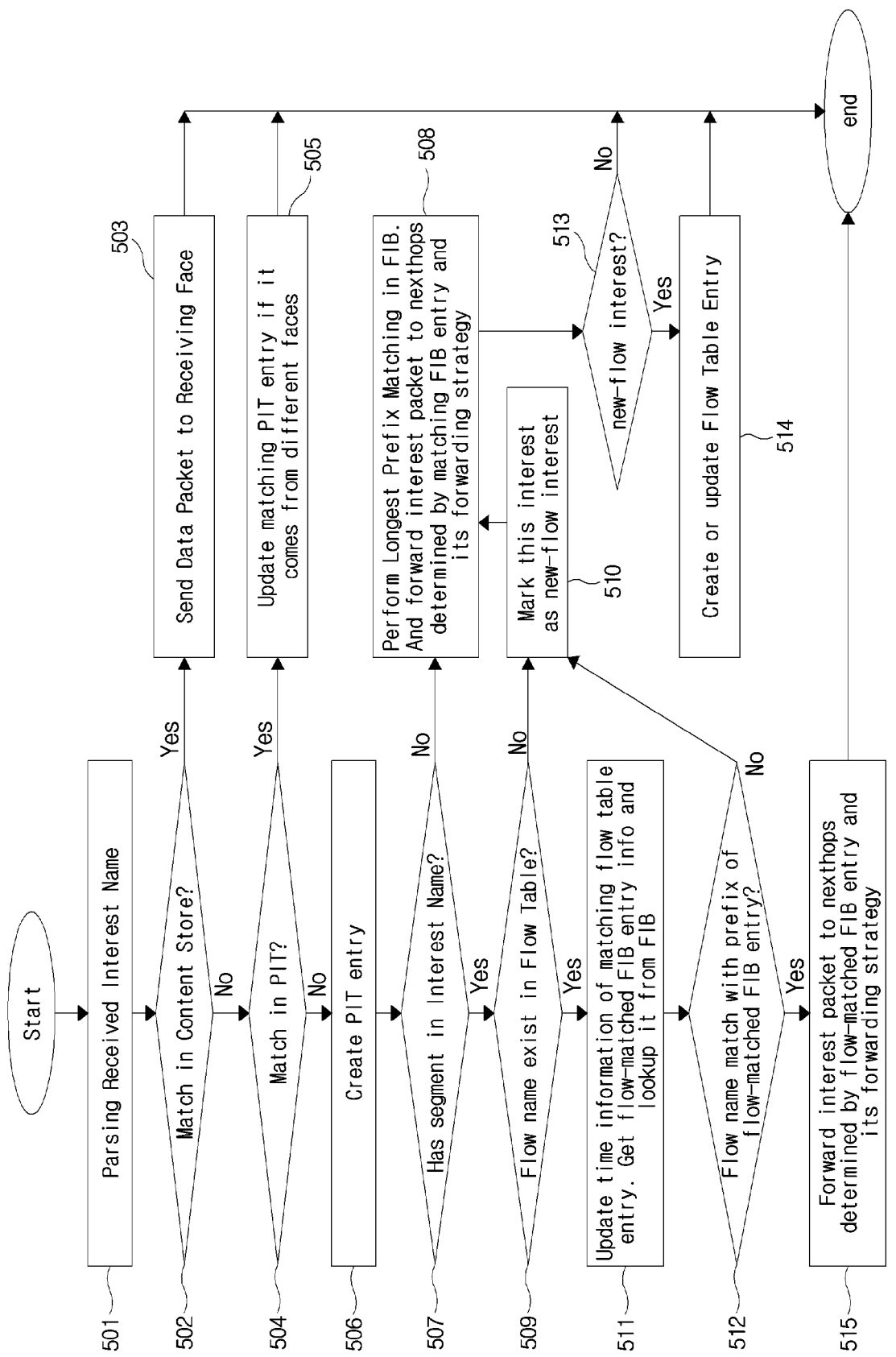
FIG. 5 is a flowchart illustrating an example of an interest packet processing process that is performed in any ICN node within information-centric networking supporting flow switching according to an embodiment of the present invention.

FIG. 5 is a flowchart illustrating an example of an interest packet processing method in an ICN node having a flow switching function according to an embodiment of the present invention.

When the interest packet is received through the communication interface means 208 and 209 of the ICN node 200, the data name requested by the interest packet is extracted at step S501. The processor 201 of the ICN node 200 determines whether data of which the data name is the same as the extracted data name is present in the content storage (CS) 202 at step S502. When the data having the same name is present within the CS 202, the data packet is transmitted through a receiving face at step S503. On the other hand, when the data having the same name is not present within the CS 202, whether the PIT entry which matches the data name is present in the PIT 204 is determined. When the PIT entry is present and the interest packet is received from the face that does not belong to an input face list of the PIT entry, the PIT entry is updated and forwarding takes place at step S505. When the PIT entry which matches the data name is not present in the PIT 204, a new PIT entry is generated at step S506. In this regard, the steps S501 to S506 are the same or similar to the processing procedures of the CS and the PIT of the general NDN/CCN node in the related art. This is a way to maintain compatibility with the conventional system.

Afterward, the segment identification unit 206 determines whether the segment is present in the data name of the interest that is forwarded after PIT lookup, at step S507. When the segment is not identified from the data name of the interest at step S507—"No", the longest prefix match (LPM) lookup is performed on the FIB to find a matched FIB entry, and then according to the nexthop list and the forwarding strategy within the FIB entry, appropriate nexthops are selected and forwarded at step S508.

In this regard, FIG. 6 is a diagram illustrating an example of an FIB entry 600. For example, a name prefix 601 is FIB entry information which is "/youtube.com/bts/", a forwarding strategy 602 is "best route", and a nexthop list 603 is (2, 5). That is, in the NDN/CCN node, the forwarding strategy 602 may be different for each name prefix 601, and the interest is forwarded to one or more nexthops selected by the forwarding strategy 602. For example, in the case of "best route" forwarding strategy, forwarding to face 2 which is the optimum nexthop is possible.

On the other hand, when the segment is identified from the data name of the interest at step S507—"Yes", whether the matched flow name is present in the flow table 205 is looked up at step S509. This is referred to as an "exact match lookup". However, the present invention is not limited to the term.

When as a result of the flow table lookup at step S509, there is no matched flow entry, the interest is marked as a new flow interest at step S510. Afterward, the step S508 where the LPM lookup is performed on the FIB 203 for forwarding is performed again, and then a new entry is generated in the flow table 205 on the basis of the matched FIB entry information at step S514.

On the other than, when as a result of the flow table lookup at step S509, the matched flow entry is present in the flow table 205, the flow-matched FIB entry information is obtained from the flow entry at step S511. That is, it is possible to obtain the matched FIB entry directly from the flow entry in the flow table 205 without performing the LPM lookup on the FIB 203. This omits the LPM process of the FIB 203, which causes a lot of delay, thereby enabling fast flow forwarding.

Also, the present invention further includes a process of checking validity of the flow entry. The process of checking validity of the flow entry of the present invention described below provides a simple and efficient effect according to the application of the flow table of the present invention.

Afterward, whether the prefix of the matched FIB entry and the flow name match is determined at step S512. When matched, it is determined that the matched FIB entry information is valid at step S512—"Yes". Then, from the forwarding information including the nexthop list and the forwarding strategy within the FIB entry, interest forwarding is adaptively performed at step S515.

On the other hand, when it is identified that the prefix of the matched FIB entry does not match the flow name at step S512—"No", it is determined that the FIB information has been changed, and the steps S510, S508, S513, and S514 are performed in that order. That is, after marking the interest as a new flow interest at step S510, the FIB is subjected to the LPM lookup to find a new matched FIB entry, and forwarding is performed on the basis of the corresponding information at step S508. Afterward, the interest is recognized as a new flow interest at step S513, and the flow entry within the flow table is updated with a new matched FIB entry information at step S514.

In this regard, as a fast flow forwarding method according to another embodiment of the present invention, a method in which the nexthop is stored as the forwarding information for each flow and the interest matched to the flow table is forwarded to the nexthop in the flow table without performing the FIB lookup may be used. However, the above embodiment requires a process of resetting the existing flow entry when the network condition is changed during the maintenance of the flow table and the optimum nexthop is changed. Further, in order to reset the flow entry, a process of identifying when resetting is required is further required.

Therefore, in the case where it is intended to design the network system for fast flow forwarding to the more accurate nexthop, it is found that the flow switching method described with reference to FIG. 5 is more useful. That is, according to the embodiment in FIG. 5, after storing the matched FIB entry information in the flow table, the flow-switched interests always cause the FIB to be subjected to lookup, whereby forwarding to the optimum nexthop appropriate for the network condition takes place. Therefore, even though the FIB 203 is modified, the step (for example, the step S512) of always checking during the flow interest forwarding whether the stored flow-matched FIB entry information is valid is performed, thereby preventing flow switching to the wrong nexthop.

In summary, the flow table 205 performs a function of fast forwarding the flow traffic being divided into multiple segments and transmitted. Specifically, the flow management unit 207 of the ICN node 200 stores the result of the FIB lookup with respect to the first segment request interest packet in the flow table 205. Afterward, when the interest packets that request another segment belonging to the flow are received continually or within a predetermined time, it is possible to perform forwarding with one FIB lookup on the basis of the flow-matched FIB entry information stored in the flow table 205.

Figure 7A:
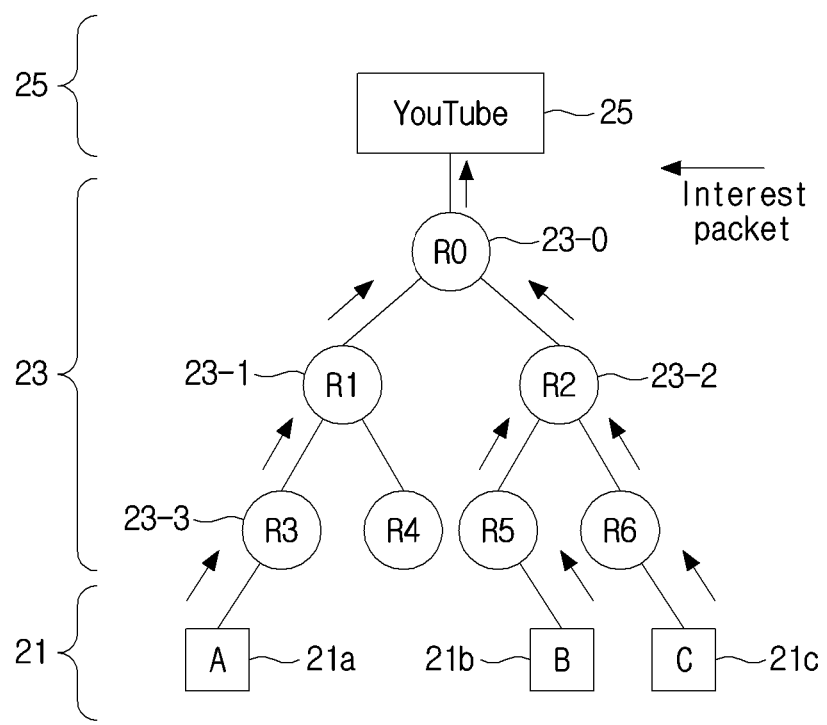
FIGS. 7A and 7B are diagrams illustrating examples of an operation of transmitting an interest packet in an information-centric networking to which a flow switching device applied to the present invention is applied.
Figure 7B:
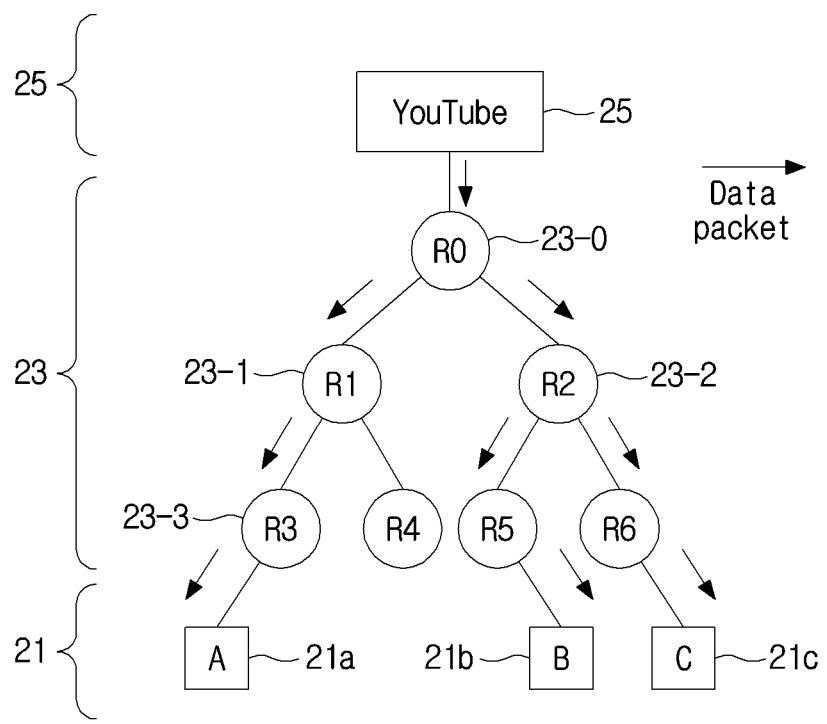

FIGS. 7A and 7B are diagrams illustrating a structure of a network system to which a flow switching device is applied according to an embodiment of the present invention. Particularly, FIGS. 7A and 7B show a process of transmitting an interest packet within the network system.

A client node 21 is a computing device in which the user requests particular information or content, and a router node 23 is a relay device that transmits a signal or data between the client node 21 and a data providing node 25 (data node) in the ICN system. In FIG. 7A, a "YouTube" server providing a video streaming service is shown as an example of the data providing node 25. In FIG. 7A, the data providing node 25 may be a server device providing video content.

For example, the users use the client nodes 21a, 21b, and 21c to transmit interest packets to the router node 23 using the name of the information or content desired to receive. For example, the client nodes 21a, 21b, and 21c transmit the interest packets for finding the information or content that the users request, to the nearby routers. For example, the client node A 21a transmits the interest packet to the nearby router R3 23-3, and the router R3 23-3 transmits the interest packet to the neighboring router R1 23-1 that is in the path to the information or content providing device, namely, the data providing node 25. The router R1 23-1 transmits the interest packet to the neighboring router R0 23-0 that is in the path to the data providing node 25. The router R0 23-0 transmits the interest packet to the data providing node 25. The remaining client node B 21b and client node C 21c transmit the interest packets to the data providing node 25 in a similar manner.

FIG. 7B shows an example of the operation of transmitting a data packet in a network system to which the flow switching device is applied according to an embodiment of the present invention.

Referring to FIG. 7B, the path through which the data packet is transmitted may be the reverse of the path through which the interest packet is transmitted. The difference between the ICN system and the IP-based network system is that when the router node 23 receives the data packet, the ICN system constantly stores the data in its storage medium. For example, when the router R3 23-3 receives, from the client node A 21a, the interest packet for content having the same data name as before, the router R3 25-3 transmits the content stored in its storage medium to the client node A 21a rather than transmits the interest packet to another router.

To this end, the router node 23 may include the above-described content storage (CS) 202 and may also include the above-described pending interest table (PIT) 204 and forwarding information base (FIB) 203 in conjunction with the CS 202. Also, the router node 23 may generate and manage the interfaces 208 and 209 for communicating with other nodes.

According to the embodiments of the present invention, in the information-centric networking, the method and the device capable of quickly and efficiently processing the flow traffic divided into segments are provided. Also, according to the embodiment of the present invention, the method and the device capable of being compatible with the existing name-based networking method and of quickly and efficiently processing the flow traffic in the information-centric networking are provided. For example, it is known that video traffic accounts for 70% or more of the Internet traffic, and it is expected that video traffic will account for 80% or more in the future. Further, the data requested by the application in the ICN includes such videos, and it is expected that the flow traffic composed of one or more segments accounts for the most part. According to the present invention, in the NDN/CCN-based ICN node, the flow traffic being divided into multiple segments and transmitted is fast forwarded, thereby considerably enhancing the forwarding performing of the ICN node in the future ICN where the flow traffic will account for the most part.

The steps of the method or algorithm described in connection with the embodiments disclosed in this specification may be implemented directly by a hardware module, a software module, or a combination thereof which is operated by a processor. The software module may reside in a storage medium (namely, a memory and/or storage) such as a RAM, a flash memory, a ROM, an EPROM, an EEPROM, a register, a hard disk, a removable disk, and a CD-ROM. The exemplary storage medium may be coupled to the processor, and the processor may read information from the storage medium and may write information to the storage medium. Alternatively, the storage medium may be integral to the processor. The processor and the storage medium may reside in an application-specific integrated circuit (ASIC). The ASIC may reside in the user terminal. Alternatively, the processor and the storage medium may reside as individual components in the user terminal.

Although the exemplary methods of the present invention are represented as a series of operations for clarity of description, the order of the steps is not limited thereto. When necessary, the steps may be performed simultaneously or in a different order. In order to implement the method according to the present invention, other steps may be added to the illustrative steps, some steps may be excluded from the illustrative steps, or some steps may be excluded while additional steps may be included.

The various embodiments of the present invention are not intended to list all possible combinations, but to illustrate representative aspects of the present invention. The matters described in the various embodiments may be applied independently or in a combination of two or more.

Also, the various embodiments of the present invention may be implemented by hardware, firmware, software, or a combination thereof. With hardware implementation, the embodiment may be implemented by using at least one selected from a group of application specific integrated circuits (ASICs), digital signal processors (DSPs), digital signal processing devices (DSPDs), programmable logic devices (PLDs), field programmable gate arrays (FPGAs), general-purpose processors, controllers, micro controllers, microprocessors, etc.

The scope of the present invention includes software (or an operating system, an application, firmware, a program, or the like) that cause operation according to the method of the various embodiments to be performed on a device or a computer, and includes a non-transitory computer-readable medium storing such software, or the like to execute on a device or a computer.

What is claimed is:

1. A flow switching method in a network node constituting an information-centric network, the flow switching method comprising:
    identifying a data name contained in a received interest packet;
    determining whether a segment name component is present in the data name;
    when the segment name component is determined to be not present in the data name, performing longest prefix match (LPM) lookup on forwarding information base (FIB) to find a matched FIB entry;
    when the segment name component is determined to be present in the data name, identifying a prefix of the data name ahead of the segment name component as a flow name from the data name, and determining whether a flow entry corresponding to the identified flow name is present within a flow table (FT);
    identifying FIB entry information matched to the flow name from the corresponding flow entry and identifying an FIB entry corresponding to the FIB entry information; and
    transmitting the interest packet on the basis of interface information included in the identified FIB entry.

2. The flow switching method of claim 1, wherein the flow entry of the flow table (FT) includes the flow name, time information, and a flow-matched FIB entry identifier.

3. The flow switching method of claim 2, further comprising:
    constructing a new flow entry that includes the flow name, the time information, and the flow-matched FIB entry identifier when the flow entry corresponding to the flow name is not present in the flow table (FT).

4. The flow switching method of claim 2, wherein a result of an FIB lookup for a first segment interest packet is stored in the flow entry of the flow table (FT), and when an interest packet requesting another segment belonging to a corresponding flow is received, forwarding is performed with one FIB entry lookup on the basis of flow-matched FIB entry information stored in the flow table (FT).

5. The flow switching method of claim 4, wherein at the transmitting of the interest packet on the basis of the interface information included in the identified FIB entry, a longest prefix match (LPM) lookup for finding the FIB entry is not performed.

6. The flow switching method of claim 1, wherein from the received data name, the prefix of the data name constituting a common name is set as the flow name and the segment name component is distinguished by at least one of a name type field, a segment tag and a segment number.

7. The flow switching method of claim 2, wherein the time information refers to a time remaining until the flow entry is deleted, and is reset to, when an interest packet requesting another segment belonging to the flow name is received within the time, an initial value assigned to the flow name.

8. The flow switching method of claim 2, wherein the time information refers to an arrival time of the interest packet that most recently matched to the flow entry, and when an interest packet requesting another segment belonging to the flow name is received within a preset time, the time information is updated with the arrival time of a corresponding interest.

9. The flow switching method of claim 1, further comprising:
    checking validity of the flow entry.

10. The flow switching method of claim 9, wherein the checking of the validity of the flow entry includes:

identifying whether a prefix of the FIB entry and the flow name match,
wherein when the prefix of the FIB entry and the flow name match, it is determined that the FIB entry information is valid, and interest forwarding is performed using forwarding information that includes a nexthop list and a forwarding strategy within the FIB entry; and
when the prefix of the FIB entry and the flow name do not match,
it is determined that the FIB information is changed, a corresponding interest is marked as a new flow interest, an FIB is subjected to a longest prefix match (LPM) lookup to find a new matched FIB entry, and forwarding is performed on the basis of corresponding information; and
the corresponding interest is recognized as the new flow interest, and the flow entry in the flow table is updated with new FIB entry information.

11. A network node constituting an information-centric network, wherein the network node supports fast flow switching, the network node comprising:
a memory and a processor,
wherein the processor controls and executes operations of:
a flow table containing a flow entry;
a segment identification logic configured to:
identify a data name contained in a received interest packet,
determine whether a segment name component is present in the data name,
when the segment name component is determined to be not present in the data name, perform longest prefix match (LPM) lookup on forwarding information base (FIB) to find a matched FIB entry, and
when the segment name component is determined to be present in the data name, identify a prefix of the data name ahead of the segment name component as a flow name from the data name; and
a flow management logic configured to:
determine whether the flow entry corresponding to the identified flow name is present within the flow table,
identify FIB entry information matched to the flow name from the corresponding flow entry,
identify an FIB entry corresponding to the FIB entry information, and
transmit the interest packet on the basis of interface information included in the identified FIB entry.

12. The network node of claim 11, wherein the flow entry of the flow table includes the flow name, time information, and a flow-matched FIB entry identifier.

13. The network node of claim 12, wherein the flow management logic sets, in the flow table, a new flow entry including the flow name, the time information, and the flow-matched FIB entry identifier when the flow entry corresponding to the flow name is not present in the flow table.

14. The network node of claim 12, wherein the flow management logic is configured to:
store a result of an FIB lookup for a first segment interest packet in the flow entry of the flow table (FT), and
perform forwarding with one FIB entry lookup on the basis of flow-matched FIB entry information stored in the flow table (FT) when an interest packet requesting another segment belonging to a corresponding flow is received.

15. The network node of claim 14, wherein at the transmitting of the interest packet on the basis of the interface information included in the identified FIB entry, the flow management logic does not perform a longest prefix match (LPM) lookup for finding the FIB entry.

16. The network node of claim 11, wherein the segment identification logic is configured to:
set, from the received data name, the name component constituting a common name as the flow name, and distinguish the remaining segment name component by a segment number such that the flow name is identified.

17. The network node of claim 12, wherein the time information refers to a time remaining until the flow entry is deleted, and is reset to, when an interest packet requesting another segment belonging to the flow name is received within the time, an initial value assigned to the flow name.

18. The network node of claim 12, wherein the time information refers to an arrival time of the interest packet that most recently matched to the flow entry, and when an interest packet requesting another segment belonging to the flow name is received within a preset time, the time information is updated with the arrival time of a corresponding interest.

19. The network node of claim 11, wherein the flow management logic checks validity of the flow entry.

20. A network node constituting an information-centric network, wherein the network node supports fast flow switching, the network node comprising:
a memory and a processor,
wherein the processor controls and executes operations of:
a flow table containing a flow entry;
a segment identification logic identifying a data name contained in a received interest packet and identifying a flow name from the data name; and
a flow management logic configured to:
determine whether the flow entry corresponding to the identified flow name is present within the flow table,
identify FIB entry information matched to the flow name from the corresponding flow entry,
identify an FIB entry corresponding to the FIB entry information, and
transmit the interest packet on the basis of interface information included in the identified FIB entry,
wherein the flow management logic checks validity of the flow entry,
wherein the checking of the validity of the flow entry by the flow management logic includes:
identifying whether a prefix of the FIB entry and the flow name match,
wherein when the prefix of the FIB entry and the flow name match, it is determined that the FIB entry information is valid, and interest forwarding is performed using forwarding information that includes a nexthop list and a forwarding strategy within the FIB entry; and
when the prefix of the FIB entry and the flow name do not match,
it is determined that the FIB information is changed, a corresponding interest is marked as a new flow interest, an FIB is subjected to a longest prefix match (LPM) lookup to find a new matched FIB entry, and forwarding is performed on the basis of corresponding information; and
the corresponding interest is recognized as the new flow interest, and the flow entry in the flow table is updated with new FIB entry information.

* * * * *